United States Patent [19]

Niyada et al.

[11] Patent Number: 5,309,547
[45] Date of Patent: May 3, 1994

[54] METHOD OF SPEECH RECOGNITION

[75] Inventors: Katsuyuki Niyada, Sagamihara; Masakatsu Hoshimi, Zama; Shoji Hiraoka, Kawasaki; Tatsuya Kimura, Sagaminhara, all of Japan

[73] Assignee: Matsushita Electric Industrial Co., Ltd., Osaka, Japan

[21] Appl. No.: 897,131

[22] Filed: Jun. 11, 1992

[30] Foreign Application Priority Data

Jun. 19, 1991 [JP] Japan .................. 3-147438

[51] Int. Cl.$^5$ .............................. G10L 5/00
[52] U.S. Cl. ...................... 395/2.47; 395/2; 395/2.4; 395/2.3
[58] Field of Search ................. 381/36, 43; 395/2, 24, 395/2.47, 2.3

[56] References Cited

U.S. PATENT DOCUMENTS

| Re. 33,597 | 5/1991 | Levinson et al. | 381/43 |
|---|---|---|---|
| 4,852,181 | 7/1989 | Morito et al. | 381/43 |
| 4,977,599 | 12/1990 | Bohl et al. | 381/43 |
| 5,031,217 | 7/1991 | Nishimura | 381/43 |
| 5,050,215 | 9/1991 | Nishimura | 381/41 |
| 5,056,143 | 10/1991 | Taguchi | 381/41 |
| 5,077,798 | 12/1991 | Ichikawa et al. | 381/36 |
| 5,133,012 | 7/1992 | Nitta | 381/43 |
| 5,148,489 | 9/1992 | Erell et al. | 381/43 |
| 5,220,609 | 6/1993 | Watanabe et al. | 381/43 |

FOREIGN PATENT DOCUMENTS 61-188599 8/1986 Japan .
62-111293 5/1987 Japan .

Primary Examiner—Allen R. MacDonald
Assistant Examiner—Tariq R. Hafiz
Attorney, Agent, or Firm—Lowe, Price, LeBlanc & Becker

[57] ABSTRACT

A method of speech recognition includes the steps of analyzing input speech every frame and deriving feature parameters from the input speech, generating an input vector from the feature parameters of a plurality of frames, and periodically calculating partial distances between the input vector and partial standard patterns while shifting the frame one by one. Standard patterns correspond to recognition-object words respectively, and each of the standard patterns is composed of the partial standard patterns which represent parts of the corresponding recognition-object word respectively. The partial distances are accumulated into distances between the input speech and the standard patterns. The distances correspond to the recognition-object words respectively. The distances are compared with each other, and a minimum distance of the distances is selected when the input speech ends. One of the recognition-object words which corresponds to the minimum distance is decided to be a recognition result.

5 Claims, 4 Drawing Sheets

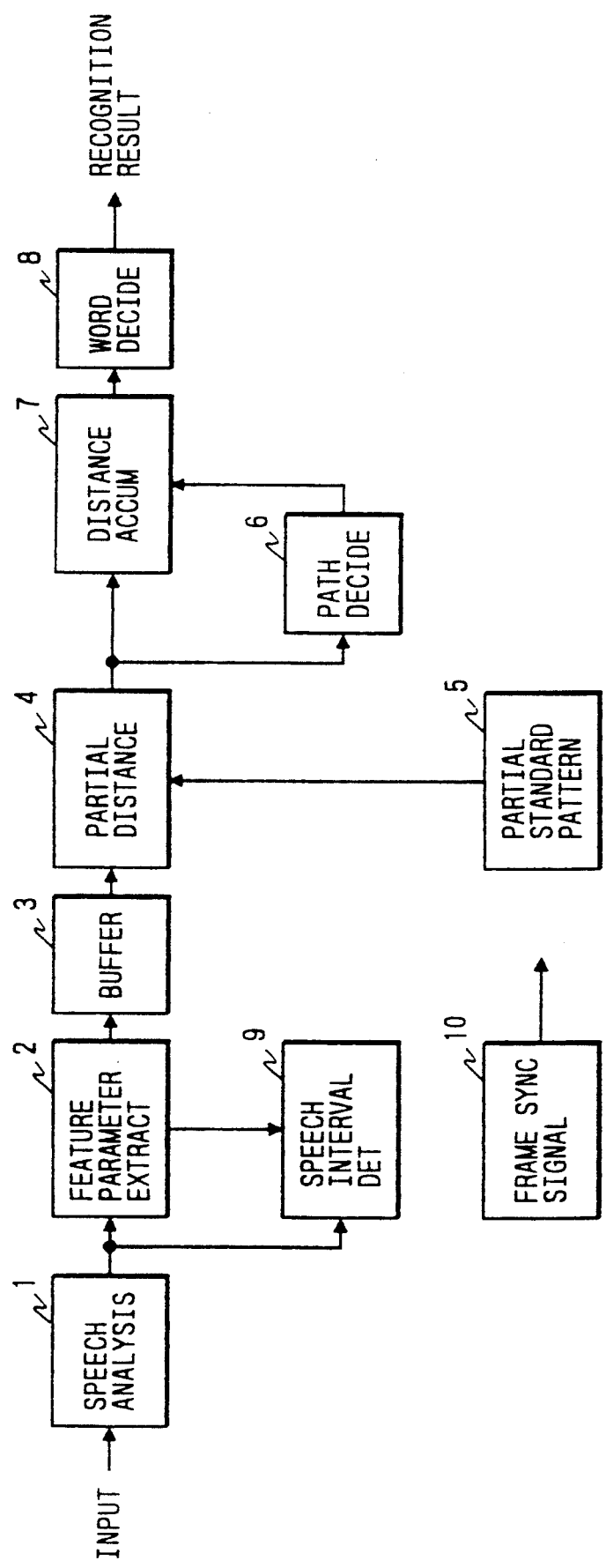

METHOD OF SPEECH RECOGNITION

BACKGROUND OF THE INVENTION

1. Field of the Invention

This invention relates to a method of speech recognition.

2. Description of the Prior Art

Japanese published unexamined patent application 61-188599 relates to a prior art method of the recognition of speech uttered by an unspecified speaker.

According to the prior art method of speech recognition which is disclosed in Japanese application 61-188599, the start point and the end point of input speech are detected, and thereby the interval of the input speech is decided. The input speech signal is subjected to a time base adjusting process while the interval of the input speech is expanded or contracted to a fixed time length corresponding to I frames. Here, the letter I denotes a given natural number. The similarities between the resultant input speech and standard patterns of recognition-object words are calculated by a pattern matching process using a statistical measure. One of the recognition-object words which corresponds to the highest similarity is selected as a recognition result.

The standard patterns of the recognition-object words in Japanese application 61-188599 are prepared as follows. First, recognition-object words are uttered by many different speakers to collect speech samples. The speech samples are expanded or contracted to a fixed time length corresponding to I frames. For each of the recognition-object words, statistical quantities (a mean value vector and a covariance matrix) between the resultant fixed-length speech samples are calculated, and the statistical quantities are processed into a related standard pattern. Thus, the time lengths of all the standard patterns are equal to the fixed time length corresponding to I frames. In general, one standard pattern is prepared for one recognition-object word.

Japanese published unexamined patent application 62-111293 discloses a prior art method of speech recognition which is improved over the prior art method in Japanese application 61-188599. While the prior art method in Japanese application 61-188599 needs a step of detecting the interval of input speech, the prior art method in Japanese application 62-111293 dispenses with such an interval detecting step and uses a word spotting technique.

According to the prior art method of speech recognition which is disclosed in Japanese application 62-111293, an input signal interval is set equal to a sufficiently long period during which speech to be recognized, noise preceding the speech, and noise following the speech occur. A temporal reference point is provided in the input signal interval. Proposed speech intervals are provided which start from the reference point and which are sequentially offset by 1-frame lengths. The shortest proposed speech interval has $N_1$ frames, where $N_1$ denotes a natural number. The longest proposed speech interval has $N_2$ frames, where $N_2$ denotes a natural number. The total number of the proposed speech intervals is equal to $N_2-N_1+1$. The input signals in the proposed speech intervals are collated with standard patterns of recognition-object words while the proposed speech intervals are expanded and contracted to a fixed time length. This collation provides the similarities or distances related to the respective recognition-object words. Such collation is reiterated while the reference point is moved from the start point to the end point of the input signal interval. Consequently, the similarities related to the respective recognition-object words are determined for all the proposed speech intervals and all the different reference points through a pattern matching process. The recognition-object word related to the maximum of the similarities is outputted as a recognition result. In the prior art method of Japanese application 62-111293, to realize the word spotting technique, the pattern matching process for the calculation of the similarities uses a statistical distance measure based on a posteriori probability.

The prior art method in Japanese application 61-188599 and the prior art method in Japanese application 62-111293 tend to be low in recognition accuracy when there are many recognition-object words. The low recognition accuracies in the prior art methods in Japanese application 61-188599 and Japanese application 62-111293 are caused by the following factors.

(1) In general, a time length varies from word to word, and the time length of a word provides some information for discriminating between words. The prior art methods do not use such information since the lengths of all recognition-object words (the time lengths of all standard patterns) are set in common to a fixed length corresponding to I frames.

(2) In the prior art methods, the input speech interval is expanded or contracted to the I-frame period, and there occur repeated or overlapped frames and omitted frames. The repeated or overlapped frames cause redundant calculation. The omitted frames cause some information to be missed out. Both of the cases omit important information representing temporal motion between adjacent frames.

SUMMARY OF THE INVENTION

It is an object of this invention to provide an improved method of speech recognition.

A first aspect of this invention provides a method of speech recognition which comprises the steps of analyzing input speech every frame and deriving feature parameters from the input speech; generating an input vector from the feature parameters of a plurality of frames; periodically calculating partial distances between the input vector and partial standard patterns while shifting the frame one by one, wherein standard patterns correspond to recognition-object words respectively, and each of the standard patterns is composed of the partial standard patterns which represent parts of the corresponding recognition-object word respectively; accumulating the partial distances into distances between the input speech and the standard patterns, the distances corresponding to the recognition-object words respectively; comparing the distances with each other and selecting a minimum distance of the distances when the input speech ends; and deciding one of the recognition-object words which corresponds to the minimum distance to be a recognition result.

A second aspect of this invention provides a method of speech recognition which comprises the steps of analyzing an input signal every frame and deriving feature parameters from the input signal, the input signal lasting for a period having a part containing input speech; generating an input vector from the feature parameters of a plurality of frames; periodically calculating partial distances between the input vector and partial standard patterns while shifting the frame one by one, wherein standard patterns correspond to recognition-object words respectively, and each of the standard patterns is composed of the partial standard patterns which represent parts of the corresponding recognition-object word respectively; accumulating the partial distances into distances between the input speech and the standard patterns, the distances corresponding to the recognition-object words respectively; comparing the distances with each other every frame, and selecting a minimum distance of the distances and one of the recognition-object words which corresponds to the minimum distance every frame; comparing the minimum distance in frames preceding the current frame and the minimum distance in the current frame, and selecting a smaller distance of the minimum distance in frames preceding the current frame and the minimum distance in the current frame as a new minimum distance to update and memorize the minimum distance and the selected recognition-object word; and deciding the memorized recognition-object word which is present at an end of the input signal to be a recognition result.

BRIEF DESCRIPTION OF THE DRAWINGS

FIG. 2 is a diagram of functions executed in the speech recognition apparatus of FIG. 1.

DESCRIPTION OF THE FIRST PREFERRED EMBODIMENT

A first embodiment of this invention is directed to speech recognition which can be applied to cases where the start point and end point of input speech are previously detected. Thus, it is sufficient that pattern matching is executed only in the input speech interval defined between the start point and the end point.

Figure 1:
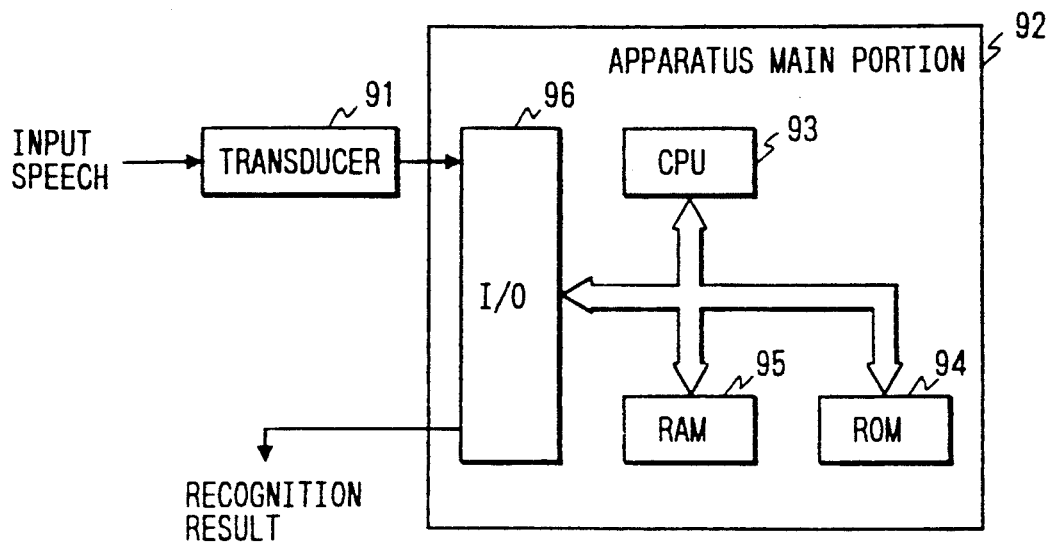
FIG. 1 is a block diagram of a speech recognition apparatus which executes a method of speech recognition according to a first embodiment of this invention.

With reference to FIG. 1, a speech recognition apparatus includes a transducer 91 and an apparatus main portion 92. The apparatus main portion 92 includes a microcomputer, a digital signal processor, or a similar device which has a combination of a CPU 93, a ROM 94, a RAM 95, and an input/output (I/O) section 96.

Speech uttered by a speaker is converted by the transducer 91 into a corresponding electric speech signal. The speech signal is inputted into the apparatus main portion 92, being subjected to a speech recognition process by the apparatus main portion 92. The apparatus main portion 92 outputs a signal representing the result of the recognition of the input speech.

Specifically, the speech signal is transmitted from the transducer 91 to the I/O section 96 of the apparatus main portion 92. The I/O section 96 includes an analog-to-digital converter which periodically samples the speech signal at a given frequency, for example, 10 kHz, and which digitizes the speech signal. The resultant digital speech signal is processed in the apparatus main portion 92. The signal representing the result of the recognition of the input speech is outputted from the I/O section 96.

The apparatus main portion 92 operates in accordance with a program stored in the ROM 94. The program is designed so as to execute the speech recognition process on the input speech signal.

In the field of inventions related to speech recognition, it is a common practice to explain the contents of the inventions with reference to diagrams of the flow of functions for an easy understanding of the inventions. It should be noted that such function flow diagrams do not directly show hardware structures. FIG. 2 is such a function flow diagram of the speech recognition apparatus.

As shown in FIG. 2, the speech recognition apparatus includes a speech analyzing section 1, a feature parameter extracting section 2, a buffer 3, a partial distance calculating section 4, a partial standard pattern store section 5, a path deciding section 6, a distance accumulating section 7, a word deciding section 8, a speech interval detecting section 9, and a frame sync signal generating section 10.

An input speech signal is divided into time segments called frames each having a predetermined period, for example, 10 ms. The input speech signal is processed frame by frame. The frame-by-frame processing is ensured by the operation of the frame sync signal generating section 10. Specifically, the frame sync signal generating section 10 generates a frame sync signal having a fixed period of, for example, 10 ms, which corresponds to a frame. The frame sync signal generating section 10 outputs the frame sync signal to the other sections 1-9 so that the sections 1-9 will operate in synchronism with the frame sync signal. Thus, the sections 1-9 execute frame-by-frame processing.

The speech analyzing section 1 subjects an input digital speech signal to LPC analysis every frame. The feature parameter extracting section 2 which follows the speech analyzing section 1 calculates feature parameters from the output signal of the speech analyzing section 1. The feature parameters are composed of LPC cepstrum coefficients $C_0, C_1, \ldots, C_{10}$ and a difference power value $V_0$. A set $x_j$ of feature parameters for a j-th frame is thus expressed as:

$$x_j = (V_0, C_0, C_1, \ldots, C_p) \tag{1}$$

where "j" denotes a frame order number, and "p" denotes the degree or dimension of the LPC cepstrum coefficients which is equal to 10.

The speech interval detecting section 9 detects the start point and the end point of speech represented by the input signal. Thus, the speech interval detecting section 9 detects the interval of input speech which is defined between the start point and the end point. The speech interval detecting section 9 executes the detection of the input speech interval by referring to a signal fed from the feature parameter extracting section 2 which represents the power of the input speech signal. When the start point of the input speech is detected by the speech interval detecting section 9, the frame order number "j" is initialized to 1 and the major part of the speech recognition process is started.

The buffer 3 which follows the feature parameter extracting section 2 combines feature parameter sets in the j-th frame and adjacent frames into an input vector $X_j$ which is expressed as:

$$X_j = (x_{j-L1}, x_{j-L1+m}, x_{j-L1+2m}, \ldots, x_j, x_{j+m}, \ldots, x_{j+L2}) \quad (2)$$

where L1, L2, and "m" denote given natural numbers. Thus, the input vector $X_j$ for the j-th frame is composed of the feature parameter sets in frames which are spaced by m-frame periods and which start at the frame $j-L1$ and end at the frame $j+L2$. The dimension of the input vector $X_j$ is equal to $(p+2) \times (L1+L2+1)$. When $L1=L2=3$ and $m=1$, the dimension of the input vector $X_j$ is equal to 84.

It should be noted that the number "m" may be variable. In this case, frames are non-linearly thinned out during the generation of the input vector $X_j$.

The partial standard pattern store section 5 holds data representing predetermined standard patterns of respective recognition-object words in a form having a combination of partial patterns.

The standard patterns are generated during a preliminary process which is executed before an actual speech recognition process. The hardware of FIG. 1 is also used in the generation of the standard patterns. A software used in the generation of the standard patterns also includes segments corresponding to the speech analyzing section 1 and the feature parameter extracting section 2 of FIG. 2. During the generation of the standard patterns, recognition-object words uttered by 100 different speakers are inputted into the hardware of FIG. 1 and are processed by the speech analyzing section 1 and the feature parameter extracting section 2 so that the feature parameter extracting section 2 outputs feature parameters corresponding to the input speech data. The standard patterns are made on the basis of the feature parameters outputted from the feature parameter extracting section 2.

The generation of the standard patterns will be described in more detail hereinafter. In cases where recognition-object words are Japanese words "zero", "ichi", "ni", "san", "yon", "go", "roku", "nana", "hachi", and "kyu" meaning zero, one, two, three, four, five, six, seven, eight, and nine respectively, the standard patterns are made according to a sequence of given steps. For example, the standard pattern of the Japanese word "san" is made as follows.

(Step 1) The Japanese word "san" is uttered by 100 different speakers, and 100 pieces of speech data representing "san" are prepared from the utterances of the 100 speakers. The 100 pieces of speech data are 100 different samples.

(Step 2) The distribution of the duration times of the utterances of the 100 speakers is analyzed, and the mean I3 of the duration times is calculated.

(Step 3) A search is made for one or more of the 100 samples which correspond to the mean duration time I3. When there is only one such sample, this sample is used as a representative sample. When there are a plurality of such samples, the mean of these samples is calculated and the mean is used as a representative sample. The representative sample is expressed as:

$$S_0 = (s_1, s_2, \ldots, s_i, \ldots, s_{I3}) \quad (3)$$

where $s_i$ denotes a parameter vector in an i-th frame which is composed of eleven LPC cepstrum coefficients and one difference power value as the feature parameter set expressed by the equation (1).

(Step 4) Pattern matching between the representative sample and each of the 100 samples is executed, and thereby the correspondence relation between the representative sample and each of the 100 samples is calculated. The pattern matching is based on the calculation of the Euclidean distances. The distance $d_{i,i'}$ between the i-th frame of the representative sample and the i-th frame of a sample is expressed as:

$$d_{i,i'} = (x_{i'} - s_i)^t \bullet (x_{i'} - s_i) \quad (4)$$

where the superscript "t" denoted a transposed matrix or vector. The correspondence relations between the frames are efficiently calculated by a dynamic programming technique.

(Step 5) Partial vectors in a form similar to the form of the equation (2) are cut out of the respective samples in correspondence with each frame (i=1, 2, ..., I3) of the representative sample. For simplicity, the numbers L1 and L2 are set to 3 and the number "m" is set to 1. A partial vector $X_i^n$ of the n-th sample among the 100 samples which corresponds to the i-th frame of the representative sample is given as:

$$X_i^n = (x_{(i)-3}^n, x_{(i)-2}^n, \ldots, x_{(i)}^n, x_{(i)+1}^n, \ldots, x_{(i)-3}^n) \quad (5)$$

where the character (i) denotes the frame of the n-th sample which corresponds to the i-th frame of the representative sample. The partial vector $X_i^n$ has a dimension of 84. The number "n" is in the range of 1 to 100.

(Step 6) A calculation is given of the mean $\mu_k^i$ of the partial vectors $X_i^n$ corresponding to the 100 samples, where "k" denotes a given number equal to 3, and i=1, 2, ..., I3. It should be noted that, in the present and later descriptions, the character "$\mu$" means a vector although it is not written as a boldface. The mean partial vector $\mu_k^i$ has a dimension of 84. A related covariance matrix $W_k^i$ is also calculated. The covariance matrix $W_k^i$ has a dimension of 84×84. The number of the mean values (the mean partial vectors) and the number of the covariance matrixes are equal to the number I3 corresponding to the standard frame length. It is unnecessary that mean values and covariance matrixes are generated for all frames. It may be good that means values and covariance matrixes are generated for some of the frames which are selected by a thinning-out process.

According to steps similar to the previously-mentioned steps 1-6, mean partial vectors (mean values) and covariance matrixes are calculated for the other recognition-object words.

Then, a moving average $\mu_e$ and a moving covariance matrix $W_e$ are calculated with respect to the samples generated from the 100 speakers and regarding all the recognition-object words. The moving average $\mu_e$ and the moving covariance matrix $W_e$ are referred to as ambient patterns.

Next, standard patterns are made on the basis of the mean values and the covariance matrixes as follows.

(Step a) The covariance matrixes are rendered common by referring to the following equation.

$$W = \frac{1}{I_1 + I_2 + \ldots + I_k + g} \left( \sum_{k=1}^{K} \sum_{i=1}^{IK} W_k^i + g \cdot W_e \right) \quad (6)$$

where "k" denotes a natural number which varies from 1 to K (equal to 10) for identifying the recognition-object words, and Ik denotes the standard time length of a recognition-object word "k". In addition, "g" denotes a ratio of adding the ambient patterns which is generally set to 1.

(Step b) Partial patterns $A_k{}^i$ and $B_k{}^i$ are made by referring to the following equations.

$$A_k{}^i = 2 \cdot W^{-1} \cdot (\mu_k{}^i - \mu_e) \qquad (7)$$

$$B_k = \mu_k \cdot W^{-1} \cdot \mu_k - \mu_e \cdot W^{-1} \cdot \mu_e \qquad (8)$$

The generation of the equations (7) and (8) will be described later.

Figure 3:
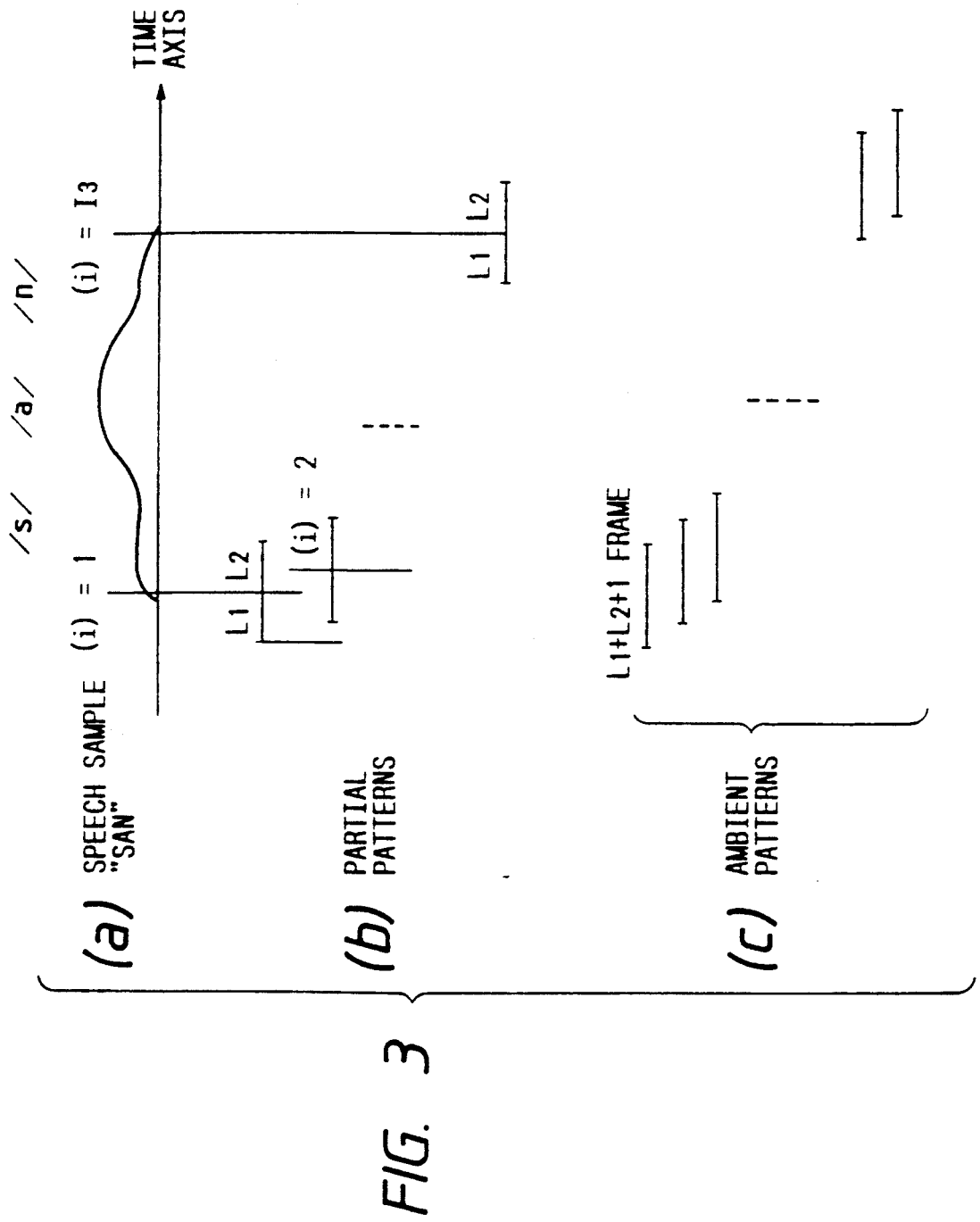
FIG. 3(a) is a diagram showing an example of the power pattern of speech.
FIG. 3(b) is a diagram showing intervals related to partial patterns.
FIG. 3(c) is a diagram showing intervals related to ambient patterns.

FIG. 3(a) shows an example of the power pattern of speech which occurs when the input signal corresponds to the Japanese word "san". As shown in FIG. 3(b), the frame correspondence between the speech sample and the representative sample is calculated in the interval between the start point and the end point of the speech sample, and thereby the speech sample is divided into I3 segments. In FIGS. 3(a) and 3(b), the frame corresponding to the representative sample is denoted by the character (i). For each of the segments between the start point of the speech at which (i)=1 and the end point of the speech at which (i)=I3, the mean values and the covariance matrixes are calculated on the basis of the sample data of the 100 speakers which occurs in the interval "(i)−L1∼(i)+L2". Thereby, partial patterns $A_k{}^i$ and $B_k{}^i$ are calculated. The standard pattern of the recognition-object word thus has the combination of the Ik partial patterns including mutually-overlapped intervals. As shown in FIG. 3(c), during the generation of the ambient patterns, the mean values and the covariance matrixes are derived while the partial interval having L1+L2+1 frames is shifted frame by frame. The range used for the generation of the ambient patterns includes the speech interval. This range may also include noise intervals preceding and following the speech interval.

Returning to FIG. 2, the partial distance calculating section 4 receives the output signal of the buffer 3 which represents the input vector $X_j$ corresponding to the plurality of the frames. The partial distance calculating section 4 also receives the output signal of the partial standard pattern store section 5 which represents the partial standard patterns of the respective recognition-object words. The partial distance calculating section 4 calculates the distances (the partial distances) between the input vector and the partial standard patterns of the respective recognition-object words as follows.

The calculation of the partial distances between the input vector and the partial patterns (the partial standard patterns) of the respective recognition-object words uses a statistical distance measure. It should be noted that the input vector is expressed in the equation (2) and has information related to the plurality of the frames. The distance corresponding to the entirety of each recognition-object word is calculated by accumulating the partial distances. The partial distances are calculated in a way such that the resultant distance values can be mutually compared independently of the position of the input vector and the differences between the partial patterns. Specifically, the distance measure is based on a posteriori probability.

The subscript "j" following the variable representing the input vector is now omitted for simplicity, and thus the input vector expressed in the equation (2) is denoted by X. It should be noted that the superscript "i" is also sometimes omitted in the following description. According to the Bayesian theory, the a posteriori probability $P(\omega_k|X)$ with respect to the partial pattern $\omega_k$ of the recognition-object word "k" is given as:

$$P(\omega_k|X) = P(\omega_k) \cdot P(X|\omega_k) / P(X) \qquad (9)$$

The probabilities of the occurrence of the respective recognition-object words are thought to be equal, and thus the first term of the right-hand side of the equation (9) is handled as a constant. The parameters are thought to be in a normal distribution, and therefore the a priori probability being the second term of the right-hand side of the equation (9) is expressed as:

$$P(X|\omega_k) = (2\pi)^{-d/2} |W_k|^{-\frac{1}{2}} \exp\{-\frac{1}{2}(X-\mu_k)^t \cdot W_k^{-1} \cdot (X-\mu_k)\} \qquad (10)$$

The term P(X) in the equation (9) represents the sum of the probabilities with respect to all possible input conditions containing spoken words and related ambient information. In cases where the parameters are LPC cepstrum coefficients or correspond to the output signal of a band pass filter, it can be thought that the values of the term P(X) are in a distribution close to a normal distribution. Now, the values of the term P(X) are presumed to be in a normal distribution. When the mean values $\mu_e$ and the covariance matrixes $W_e$ are used, the term P(X) is expressed as:

$$P(X) = (2\pi)^{-d/2} |W_e|^{-\frac{1}{2}} \exp\{-\frac{1}{2}(X-\mu_e)^t \cdot W_e^{-1} \cdot (X-\mu_e)\} \qquad (11)$$

The equations (10) and (11) are inserted into the equation (9). The calculation of the logarithm of the resultant equation, the omission of the constants, and the multiplication by −2 result in the following equation.

$$L_k = (X-\mu_k)^t \cdot W_k^{-1} \cdot (X-\mu_k) - (X-\mu_e)^t \cdot W_e^{-1} \cdot (X-\mu_e) + \log |W_k|/|W_e| \qquad (12)$$

The equation (12) corresponds to the Bayesian distance made into a form represented by the a posteriori probabilities. Although the equation (12) can provide a high ability of recognition, the equation (12) tends to require a large amount of calculation. The equation (12) is developed into a linear discriminant as will be described hereinafter. The covariance matrixes are presumed to be equal with respect to all the partial patterns of all the recognition-object words and all the related ambient patterns. The covariance matrixes are made common by referring to the equation (6). When the matrix W is substituted for the matrixes $W_k$ and $W_e$ in the equation (12), the first and second terms of the right-hand side of the equation (12) are developed as follows.

$$(X-\mu_k)^t \cdot W_k^{-1} \cdot (X-\mu_k) = X^t \cdot W^{-1} \cdot X - a_k{}^t \cdot X + b_k \qquad (13)$$

$$(X-\mu_e)^t \cdot W_e^{-1} \cdot (X-\mu_e) = X^t \cdot W^{-1} \cdot X - a_e{}^t \cdot X + b_e \qquad (14)$$

The factors $a_k$ and $a_e$ used in the equations (13) and (14) are expressed as:

$$a_k = 2W^{-1} \cdot \mu_k, \quad b_k = \mu_k{}^t \cdot W^{-1} \cdot \mu_k \qquad (15)$$

$$a_e = 2W^{-1} \cdot \mu_e, \quad b_e = \mu_e{}^t \cdot W^{-1} \cdot \mu_e \qquad (16)$$

The third term of the right-hand side of the equation (12) is equal to 0. As a result, the equation (12) is converted into the following simple linear discriminant.

$$L_k = (b_k - b_e) - (a_k - a_e)^t \cdot X \qquad (17)$$

With respect to the distance $L_k{}^{i,j}$ between the j-th-frame component of the input vector of the equation (2) and the i-th-frame component of the partial pattern of the recognition-object word "k", the equation (17) is rewritten into a form as follows.

$$L_k{}^{i,j} = B_k{}^i - A_k{}^i \cdot X_j \qquad (18)$$

where $B_k{}^i$ and $A_k{}^i$ are given by the equations (7) and (8) respectively. The distance $L_k{}^{i,j}$ is equal to the partial similarity between the i-th partial pattern of the recognition-object word "k" and the part of the input vector adjacent to the j-th frame.

With reference to FIG. 2, the distance accumulating section 7 which follows the partial distance calculating section 4 accumulates the partial distances for the intervals i=1, 2, ..., Ik with respect to each of the recognition-object words, and thereby calculates the distance with respect to the entire of each of the recognition-object words. The accumulation of the partial distances is executed while the input speech length is expanded or contracted to the standard time length Ik of each recognition-object word. In addition, the accumulation of the partial distances is efficiently executed according to a dynamic programming method.

For example, regarding the Japanese word "san", the partial distances are accumulated into the final distance as follows. The Japanese word "san" corresponds to a word identification number "k" of 3. The description of the word identification number "k" will be omitted from the following description. The partial distance $L^{i,j}$ between the j-th-frame component of the input vector and the i-th-frame component of the partial pattern is now represented by l(i,j). In addition, the result of the accumulation of the partial distances up to the (i, j)-th frames is represented by g(i, j). The accumulation-result distance g(i, j) is given as:

$$g(i,j) = \min \begin{cases} g(i-1, j-2) + l(i,j) \\ g(i-1, j-1) + l(i,j) \\ g(i-2, j-1) + l(i-1,j) + l(i,j) \end{cases} \qquad (19)$$

where "min" denotes the operator of selecting the minimum of members following the operator character.

The equation (19) shows that there are three different paths. The path deciding section 6 which is connected to both the partial distance calculating section 4 and the distance accumulating section 7 selects one of the three different paths which minimizes the accumulation-result distance.

Figure 4:
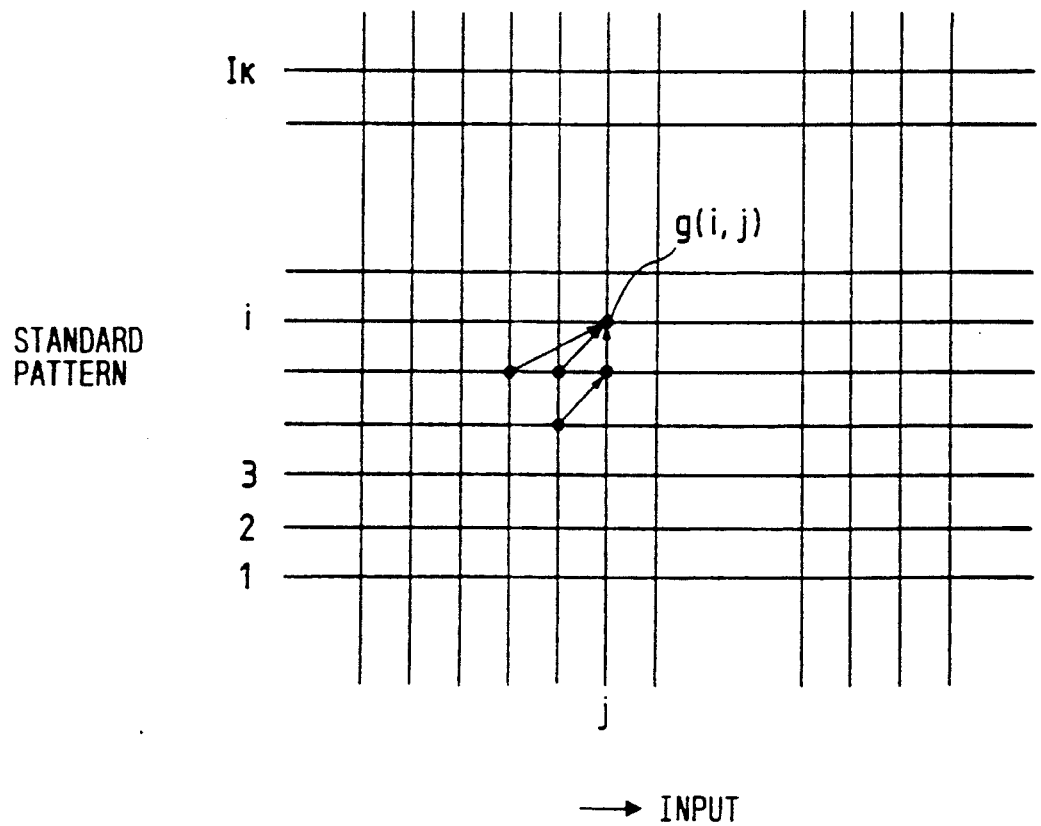
FIG. 4 is a diagram showing paths used in the calculation of distances.

As shown in FIG. 4, the dynamic programming method uses the pen-type asymmetric paths. It should be noted that the dynamic programming method may use other paths. In addition, the dynamic programming method may be replaced by a linear expansion/contraction method or a hidden Markov model method.

The distance accumulating section 7 sequentially accumulates the partial distances. For each of the recognition-object words, the distance accumulating section 7 calculates the accumulation-result distance $G_k(Ik, j)$ which occurs when i=Ik and j=J.

The word deciding section 8 which follows the distance accumulating section 7 selects the minimum value of the accumulation-result distances, and decides the recognition-object word, which corresponds to the minimum accumulation-result distance, to be a recognition result $\hat{k}$. The word deciding section 8 outputs data representing the recognition result $\hat{k}$. Specifically, the recognition result $\hat{k}$ is given as:

$$\hat{k} = \underset{k}{\operatorname{argmin}}\, G_k(Ik,j) \qquad (20)$$

Experiments were performed by using speech data which was generated from 150 male and female speakers and which represented 10 Japanese words "zero", "ichi", "ni", "san", "yon", "go", "roku", "nana", "hachi", and "kyu" meaning zero, one, two, three, four, five, six, seven, eight, and nine respectively. The standard patterns were previously made on the basis of the speech data generated from 50 male speakers and 50 female speakers of the 150 speakers. Then, the speech data generated from the other 50 speakers was subjected to the recognition process while the previously-made standard patterns were used. The partial patterns were made under conditions where L1=L2=5 and m=1 (see the equation (2)). The frame period was equal to 10 ms. The sampling frequency was equal to 10 kHz. The pass band of an input filter (not shown) was equal to the range of 300 to 5,000 Hz. Good recognition results were obtained at a rate of 99.6%.

DESCRIPTION OF THE SECOND PREFERRED EMBODIMENT

A second embodiment of this invention is similar to the embodiment of FIGS. 1-4 except for design changes described hereinafter. The second embodiment uses a word spotting technique and dispenses with the detection of an input speech interval. According to the second embodiment, a minimum-distance part of an input speech signal is cut out or spotted, and speech recognition is executed on the basis of the spotted part of the input speech signal. The word spotting technique is based on the thought that if speech components corresponding to one of recognition-object words are present in a part of an input signal, the distance (the accumulation-result distance) between the input speech and a correct standard pattern is minimized for the interval corresponding to the part of the input signal. Thus, in the second embodiment, for a sufficiently long interval including a possible input speech interval and noise intervals preceding and following the input speech interval, the input speech signal is collated with standard patterns of the recognition-object words while the input speech signal is shifted frame by frame.

Figure 5:
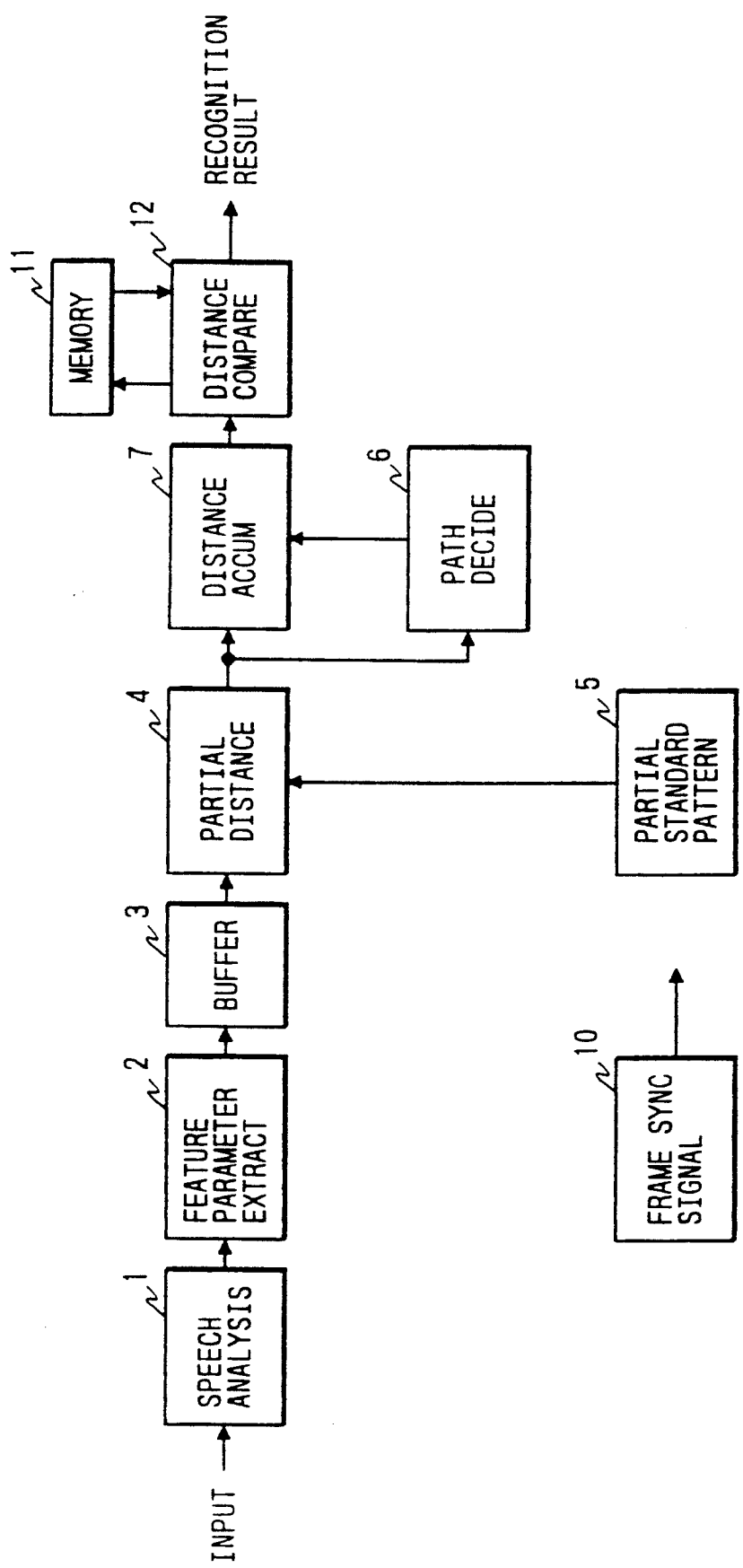
FIG. 5 is a diagram of functions in a speech recognition apparatus executing a method of speech recognition according to a second embodiment of this invention.

As shown in FIG. 5, the second embodiment includes a speech analyzing section 1, a feature parameter extracting section 2, a buffer 3, a partial distance calculating section 4, a partial standard pattern store section 5, a path deciding section 6, a distance accumulating section 7, a frame sync signal generating section 10, a temporary memory 11, and a distance comparing section 12. The second embodiment is different from the embodiment of FIGS. 1-4 in that the speech interval detecting section 9 (see FIG. 2) is omitted and the word deciding section 8 (see FIG. 2) is replaced by a combination of the temporary memory 11 and the distance comparing section 12.

In the second embodiment, the moment of the start of pattern matching, that is, the moment at which j=1, precedes the start point of input speech. In addition, the moment of the end of the pattern matching, that is, the moment at which j=J, follows the end point of the input speech. The moment at which the distances with all the standard patterns become sufficiently large is used as the moment for ending the pattern matching. Thus, at this moment, the setting "j=J" is done.

The standard patterns are made as in the embodiment of FIGS. 1-4. The range used for the generation of the ambient patterns from speech samples is set equal to a sufficiently long interval including a possible speech interval and noise intervals preceding and following the speech interval. This setting is done for the reason concerning the definition that the denominator P(X) in the equation (9) is the probability density with respect to all the parameters being an object subjected to the pattern matching.

The distance comparing section 12 which follows the distance accumulating section 7 compares the magnitudes of the accumulation-result distances of the respective recognition-object words every frame. Specifically, the distance comparing section 12 compares the accumulation-result distances $G_k(Ik, j)$ of the respective recognition-object words for the j-th frame of the input speech. Thereby, the distance comparing section 12 selects the minimum value $\hat{G}_j$ of the accumulation-result distances $G_k(Ik, j)$, and decides the recognition-object word, which corresponds to the minimum accumulation-result distance $\hat{G}_j$, to be a potential recognition result $\hat{k}_j$ for the j-th frame. The potential recognition result $\hat{k}_j$ and the minimum accumulation-result distance $\hat{G}_j$ are expressed as:

$$\hat{k}_j = \underset{k}{\operatorname{argmin}} G_k(Ik,j) \quad (21)$$

$$\hat{G}_j = \underset{k}{\operatorname{min}} G_k(Ik,j) \quad (22)$$

The temporary memory 11 holds the minimum value Gmin of the accumulation-result distances which occur during the period up to the (j−1)-th frame. In addition, the temporary memory 11 holds the word identification number "k" (the potential recognition result) corresponding to the minimum accumulation-result distance Gmin. The temporary memory 11 which is connected to the distance comparing section 12 informs the distance comparing section 12 of the minimum accumulation-result distance Gmin. The distance comparing section 12 compares the distances Gmin and $\hat{G}_j$. When Gmin$\leq\hat{G}_j$, the distance comparing section 12 does not update the distance and the related word identification number held by the temporary memory 11. Then, the frame order number "j" is incremented by 1 so that the processing of the next frame can be started. When Gmin>$\hat{G}_j$, the distance comparing section 12 replaces the value Gmin in the temporary memory 11 with the value $\hat{G}_j$ and thereby updates the minimum distance Gmin in the temporary memory 11. In addition, the distance comparing section 12 replaces the word identification number in the temporary memory 11 with the word identification number corresponding to the value $\hat{G}_j$ and thereby updates the word identification number "k" (the potential recognition result) in the temporary memory 11. In other words, the distance comparing section 12 executes "Gmin=$\hat{G}_j$" and "k=$\hat{k}_j$". Then, the frame number "j" is incremented by 1 so that the processing of the next frame can be started. As a result, the minimum distance Gmin which occurs during the frames up the current frame remains in the temporary memory 11. In addition, the word identification number "k" (the potential recognition result) corresponding to the minimum distance Gmin remains in the temporary memory 11. When the frame number "j" reaches the given number J and thus the pattern matching period elapses, the distance comparing section 12 reads out the word identification number "k" (the potential recognition result) from the temporary memory 11 and outputs the readout word identification number "k" (the potential recognition result) as a final recognition result $\hat{k}$.

Experiments were performed by using speech data which was generated from 150 male and female speakers and which represented 10 Japanese words "zero", "ichi", "ni", "san", "yon", "go", "roku", "nana", "hachi", and "kyu" meaning zero, one, two, three, four, five, six, seven, eight, and nine respectively. The standard patterns were previously made on the basis of the speech data generated from 50 male speakers and 50 female speakers of the 150 speakers. Then, the speech data generated from the other 50 speakers was subjected to the recognition process while the previously-made standard patterns were used. The partial patterns were made under conditions where L1=L2=5 and m=1 (see the equation (2)). The frame period was equal to 10 ms. The sampling frequency was equal to 10 kHz. The pass band of an input filter (not shown) was equal to the range of 300 to 5,000 Hz. The interval during which the speech recognition process remained executed preceded the start point of the speech period by 15 frames, and followed the end point of the speech period by 15 frames. Good recognition results were obtained at a rate of 99.4%.

What is claimed is:

1. A method of speech recognition, comprising the steps of:

analyzing input speech every frame and deriving feature parameters from the input speech;

generating an input vector from the feature parameters of a plurality of frames;

forming partial standard patterns to contain a correlation between frames of speech data by using speech data of a plurality of frames;

calculating partial distances between the input vector and partial standard patterns while shifting the frame one by one, wherein standard patterns correspond to recognition-object words respectively, and each of the standard patterns is composed of the partial standard patterns which represent parts of the corresponding recognition-object word respectively;

the partial-distance calculating step comprising the step of using a statistical distance measure based on a posteriori probability in measuring the partial distances;

accumulating the partial distances into distances between the input speech and the standard patterns, the distances corresponding to the recognition-object words respectively;

comparing the distances with each other and selecting a minimum distance of the distances when the input speech ends; and deciding one of the recognition-object words which corresponds to the minimum distance to be a recognition result.

2. The method of claim 1, wherein the statistical distance measure comprises a linear determinant based on a posteriori probability.

3. A method of speech recognition, comprising the steps of:

analyzing an input signal every frame and deriving feature parameters from the input signal, the input signal lasting for a period having a part containing input speech;

generating an input vector from the feature parameters of a plurality of frames;

forming partial standard patterns to contain a correlation between frames of speech data by using speech data of a plurality of frames;

calculating partial distances between the input vector and partial standard patterns while shifting the frame one by one, wherein standard patterns correspond to recognition-object words respectively, and each of the standard patterns is composed of the partial standard patterns which represent parts of the corresponding recognition-object word respectively;

accumulating the partial distances into distances between the input speech and the standard patterns, the distances corresponding to the recognition-object words respectively;

comparing the distances with each other every frame, and selecting a minimum distance of the distances and one of the recognition-object words which corresponds to the minimum distance every frame;

comparing the minimum distance in frames preceding the current frame and the minimum distance in the current frame, and selecting a smaller distance of the minimum distance in frames preceding the current frame and the minimum distance in the current frame as a new minimum distance to update and memorize the minimum distance and the selected recognition-object word; and deciding the memorized recognition-object word which is present at an end of the input signal to be a recognition result.

4. A method of speech recognition, comprising the steps of:

analyzing an input signal every frame and deriving feature parameters from the input signal, the input signal lasting for a period having a part containing input speech;

generating an input vector from the feature parameters of a plurality of frames;

forming partial standard patterns to contain a correlation between frames of speech data by using speech data of a plurality of frames;

calculating partial distances between the input vector and partial standard patterns while shifting the frame one by one, wherein standard patterns correspond to recognition-object words respectively, and each of the standard patterns is composed of the partial standard patterns which represent parts of the corresponding recognition-object word respectively;

accumulating the partial distances into distances between the input speech and the standard patterns, the distances corresponding to the recognition-object words respectively;

comparing the distances with each other every frame, and selecting a minimum distance of the distances and one of the recognition-object words which corresponds to the minimum distance every frame;

comparing the minimum distance in frames preceding the current frame and the minimum distance in the current frame, and selecting a smaller distance of the minimum distance in frames preceding the current frame and the minimum distance in the current frame as a new minimum distance to update and memorize the minimum distance and the selected recognition-object word; and deciding the memorized recognition-object word which is present at an end of the input signal to be a recognition result, wherein the partial-distance calculating step comprises using a statistical distance measure based on a posteriori probability in measuring the partial distances.

5. The method of claim 4, wherein the statistical distance measure comprises a linear determinant based on a posteriori probability.

* * * * *